United States Patent Office 3,056,319
Patented Oct. 2, 1962

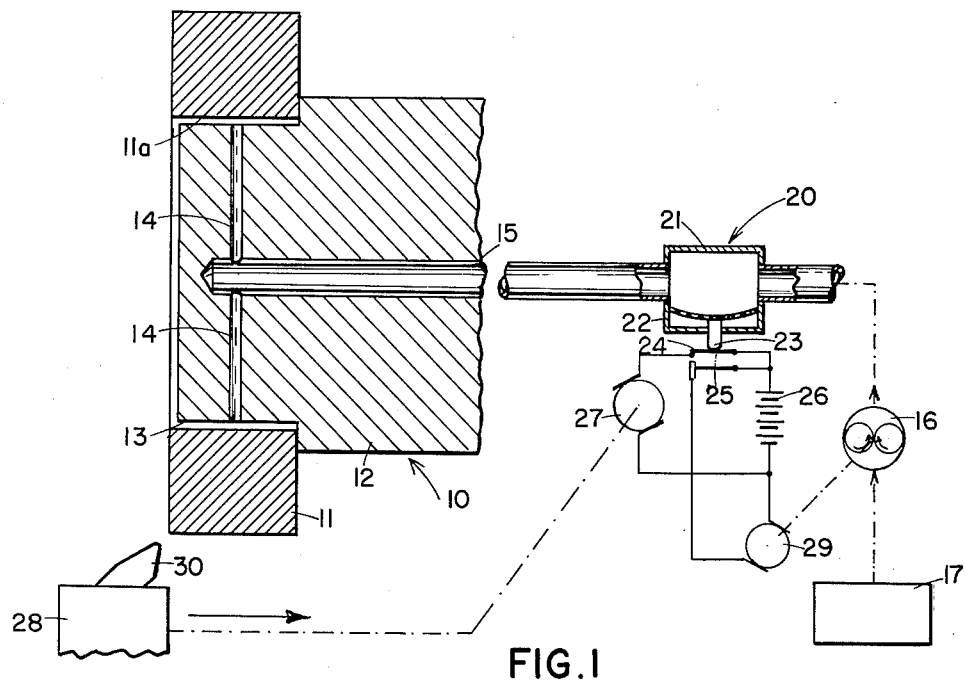

3,056,319
CONTROL SYSTEM FOR MACHINE TOOLS
Ernst Thielenhaus, Wuppertal-Barmen, Germany, assignor to Firma Ernst Thielenhaus, Maschinenfabrik, Wuppertal-Barmen, Germany, a company of Germany
Filed Sept. 8, 1960, Ser. No. 54,613
Claims priority, application Germany Sept. 24, 1959
6 Claims. (Cl. 82—21)

My present invention relates to a control system for machine tools.

Automatic and semi-automatic machine tools such as lathes, milling machines, screw machines and the like are generally provided with a manually or hydraulically operable workpiece-holding mechanism as well as hydraulic or electric motors or conventional lead-screw drives for the tool carriages and/or cross-slides. The carriages and cross-slides, which are displaceable relative to the workpiece along the bed or transversely thereto, respectively, are customarily provided with limit switches or stops for halting the motion of the tool in accordance with a predetermined program. Such control arrangements must include relatively complex and expensive safety devices adapted to halt the program in the event of failure of the workpiece-holding mechanism or in the control system.

It is an object of the present invention to provide an improved and relatively foolproof system for stopping the motion of a tool in absence of a correctly positioned workpiece.

Another object of the invention is to provide a machine-tool-control system responsive to the presence of workpieces not conforming to predetermined tolerances.

According to my invention, the fluid-supply line of a pneumatic or hydraulic workpiece-holding mechanism is provided with means responsive to a pressure drop at the workpiece seat and adapted to act upon the tool-control system or the programming system of the machine tool. Preferably, the workpiece-holding mechanism comprises an internal or external centering holder of the type disclosed in my co-pending application Ser. No. 54,651, filed concurrently herewith. The holder comprises means for admitting a fluid under pressure into a limited annular clearance between its body and the workpiece for suspending the latter upon a cushion of fluid. Should no workpiece be present or should the workpiece not conform to predetermined tolerances, the limited annular clearance will be relatively enlarged, thereby resulting in a proportionate pressure drop in the fluid-supply line. Similarly, a failure of the pressure supply for the workpiece-holding mechanism will cause a pressure drop which, via switch means or the like, may cut off the motion of the carriage and slide.

According to a more specific feature of the invention, a pressure-sensitive membrane switch is connected in the electrical supply systems for the tool-carriage motors or for the main drive motor of the machine tool, and/or to the supply pump for the workpiece-centering fluid, to stop the motors when the pressure falls below a predetermined minimum in the supply line to the holding mechanism. The switch may also actuate hydraulic control valves or the like for deactivating non-electrical control elements.

The above and other objects, features and advantages of my invention will become more readily apparent from the following description, reference being made to the accompanying drawing in which:

FIG. 1 is a schematic illustration of a control system according to the invention; and FIG. 2 is an illustration of a system according to another embodiment of the invention.

In FIG. 1 I show a holding device 10, of the type described in detail in my above-identified co-pending application, for a ring 11 which may be part of a ball-bearing race. The holder 10 comprises a mandrel 12 provided with a surface 13 which is limitedly spaced from a confronting surface 11a of ring 11. An axial conduit 15 in the mandrel 12 supplies a fluid under pressure to the annular clearance between surfaces 11a and 13 via the radial bores 14 to suspend and center the workpiece 11 upon a cushion of fluid. The conduit 15 is connected to a fluid-supply pump 16 via a pressure-sensitive membrane switch 20. Pump 16 is fed from a fluid reservoir 17. The switch 20 comprises a pressure chamber 21 housing a membrane 22 whose plunger 23 bears upon the switches 24 and 25.

Normally open switch 24 is connected in series with a source 26 of electric current and a motor 27 which drives the tool carriage 28 via a conventional lead screw. Switch 25 is serially connected between the battery 26 and a motor 29 which drives the pump 16.

In operation, a fluid (e.g. air) is pumped from the source 17 via membrane switch 20 and conduits 14 and 15 into the limited annular clearance between workpiece 11 and holder 12. Owing to the limited cross-sectional area of the clearance, fluid flow from the gap is restricted and a dynamic equilibrium in the supply conduit 15 and the membrane switch 20 is reached wherein the pressure acting upon membrane 22 is sufficient to maintain the switches 24 and 25 in their closed positions. The tool carriage 28 is thus activated so that its tool 30 may traverse a surface of the workpiece 11. Should a failure of the pump 16 occur, however, the pressure against membrane 22 would fall sufficiently to open-circuit switches 24 and 25 so as to de-energize the motors 27 and 29 and halt the carriage 28 and the pump 16. When no workpiece is held by the mandrel 12, the lack of a limited clearance results in a similar pressure drop and deactivation of pump and carriage. When a faulty workpiece 11 having an oversize surface 11a is held by the mandrel 12, the cross-sectional area of the clearance is materially increased so that the membrane 22 experiences reduced pressure and the switch 24 is opened to halt the carriage 28.

FIG. 2 illustrates another embodiment wherein the plunger 23 of membrane switch 20 bears upon the switch 24' which is now connected in series with the battery 26 and a solenoid 31. The latter actuates a distributing valve 32 of a hydraulic control system for the carriage 28. When the pressure in the membrane switch is at a normal level, hydraulic fluid flows from a source 33 via a pump 34 and the valve 32 to the hydraulic motor of the carriage 28. When, however, the pressure in the membrane switch 20 falls below a predetermined minimum as a result of a faulty workpiece or the lack of a workpiece in the holding device, switch 24' completes a circuit to the solenoid 32 to cut off the flow of hydraulic fluid to the carriage 28 via valve 32 and to bypass the flow to the reservoir 33.

The system described and illustrated is believed to admit of many modifications and variations readily apparent to persons skilled in the art and deemed to be included within the spirit and scope of the invention as defined in the appended claims.

I claim:

1. In a control system for the tool carriage of a machine tool, in combination, drive means for said carriage, a holder for a workpiece, said holder comprising a body having a closed surface and means at said surface for continuously introducing a fluid into a clearance between said surface and a confronting closed surface of a workpiece limitedly spaced therefrom, thereby suspending said workpiece on a cushion of said fluid, a source of fluid pressure for said holder, and means connected between said source and said holder responsive to a fluid-pressure drop below a predetermined minimum value for inactivating said drive means.

2. In a control system for the tool carriage of a machine tool, in combination, drive means for said carriage, a source of energy for said drive means, a holder for a workpiece, said holder comprising a body having a closed surface and means at said surface for continuously introducing a fluid into a clearance between said surface and a confronting closed surface of a workpiece limitedly spaced therefrom, thereby suspending said workpiece on a cushion of said fluid, a source of fluid pressure for said holder, and pressure-sensitive switch means connected between said source of fluid pressure and said holder responsive to a fluid-pressure drop below a predetermined minimum value for de-energizing said drive means.

3. The combination according to claim 2 wherein said drive means comprises an electric motor and said switch means comprises a switch member in the energizing circuit for said motor.

4. The combination according to claim 2 wherein said drive means comprises a hydraulic motor and said switch means comprises valve means in the fluid-supply path to said motor, solenoid means acting upon said valve means and a pressure-responsive switch member in circuit relation with said solenoid means.

5. The combination according to claim 2 wherein said switch means comprises a membrane switch.

6. In a control system for the tool carriage of a machine tool, in combination, drive means for said carriage, a source of energy for said drive means, a holder for a workpiece, said holder comprising a rotary body having a closed surface centered on the axis of rotation of said body and means at said surface for continuously introducing a fluid into a clearance between said surface and a confronting closed surface of a workpiece limitedly spaced therefrom, thereby centering said workpiece on said holder, a source of fluid pressure for said holder, and pressure-sensitive switch means connected between said source of fluid pressure and said holder responsive to a fluid-pressure drop below a predetermined minimum value for de-energizing said drive means.

References Cited in the file of this patent

UNITED STATES PATENTS

| | | |
|---|---|---|
| 2,625,061 | Mansfield | Jan. 13, 1953 |
| 2,790,340 | Cross | Apr. 30, 1957 |